United States Patent
Asano et al.

(10) Patent No.: US 7,231,696 B2
(45) Date of Patent: Jun. 19, 2007

(54) CLIP

(75) Inventors: Kazunori Asano, Kanagawa (JP);
Nobuya Shinozaki, Kanagawa (JP);
Shigeo Okada, Kanagawa (JP)

(73) Assignee: Piolax, Inc., Yokohama-shi, Kanagawa-ken (JP)

( * ) Notice: Subject to any disclaimer, the term of this patent is extended or adjusted under 35 U.S.C. 154(b) by 83 days.

(21) Appl. No.: 11/019,687

(22) Filed: Dec. 23, 2004

(65) Prior Publication Data

US 2005/0155191 A1 Jul. 21, 2005

(30) Foreign Application Priority Data

Dec. 26, 2003 (JP) ............... P. 2003-434563

(51) Int. Cl.
*F16B 5/06* (2006.01)
(52) U.S. Cl. .................................. 24/297; 24/453
(58) Field of Classification Search ........... 248/638; 267/141, 292, 153; 24/289, 295–297, 458, 24/453; 411/508–510; 174/138 D, 138 G; 52/716.7, 718.06, 718.03; 403/397
See application file for complete search history.

(56) References Cited

U.S. PATENT DOCUMENTS

| 6,405,413 | B2* | 6/2002 | Ichimaru et al. | ............ 24/297 |
| 6,449,814 | B1* | 9/2002 | Dinsmore et al. | ............ 24/297 |
| 2003/0079316 | A1* | 5/2003 | Ogawa | ............ 24/297 |

FOREIGN PATENT DOCUMENTS

| JP | 11-280719 | 10/1999 |
| JP | 2001-289217 | 10/2001 |

* cited by examiner

*Primary Examiner*—James R. Brittain
(74) *Attorney, Agent, or Firm*—McGinn IP Law Group, PLLC

(57) ABSTRACT

A clip has a base A having a U shape composed of a pair of parallel sections, and a joining section having flexibility and interconnecting the lower parts thereof, elastic pieces respectively branching from the insides of the parallel sections in the opposed directions, and extending along the parallel sections and the joining section, claws respectively protruding inwardly on the elastic pieces, and step sections having upper surfaces respectively projecting outward from the outer sides of the parallel sections and being inclined obliquely downward.

11 Claims, 10 Drawing Sheets

CLIP

BACKGROUND OF THE INVENTION

1. Field of the Invention

The present invention relates to a clip capable of mounting, to a plate-like to-be-fixed member such as a panel which has been previously provided with a mounting hole, a fixing member such as a dashboard or a switchboard including a protrusion to be inserted into the mounting hole, and being subjected to reuse after removal from the to-be-fixed member together with the fixing member.

2. Description of the Related Art

Conventionally, in order to fix a to-be-mounted member including a mounting hole and a fixing member including a plate-like protrusion, a clip interposes the plate-like protrusion from the upper part in the inside of a generally U shape. The parallel sections of the U shape having an elastic function are each provided on the outer side with a step section for being locked in the hole edge of the mounting hole. Thus, the clip fixes the fixing member into the mounting hole provided in the to-be-fixed member. In the clip, the parallel sections are provided on their respective inner sides with elastic beams each parallel to the parallel sections of the U shape, and having the opposite ends integrally connected to each parallel section. Thus, the projections disposed on the respective elastic beams press against the plate-like protrusion of the fixing member from the opposite sides, and the claws disposed on the elastic beams are engaged in the locking hole disposed in the protrusion. Thus, the clip and the fixing member are fixed on the to-be-fixed member (see, for example, JP-A-2001-289217).

Whereas, claws are respectively disposed on the tips of elastic pieces extending in such a manner as to mutually approach toward the open side from the opposed inner sides of the central parts of the parallel sections of the U shape. Thus, the claws are engaged in a locking hole provided in a protrusion of a fixing member, so that a clip is fixed in a mounting hole of a to-be-fixed member (see, for example, JP-A-11-280719).

Further, there is disclosed another clip. The clip has a pair of elastic pieces extending in an inclined manner so as to mutually approach from the inner sides of a U-shaped member on the open side toward the inner closed side. It allows a fixing member which is a panel to advance until the side edge portion abuts the closed end while pressing against the surface of the side edge portion of the fixing member by the tip of the elastic pieces. Simultaneously, it interposes the middle portion of the panel between the tip portions of the elastic pieces for locking. Further, the clip is inserted into a long trench formed in a framework for fixing, thereby to be fixed in the framework (see, for example, JP-A-10-299148).

However, the conventional clip is configured such that the claws disposed on the elastic pieces or the elastic beams, or the elastic pieces themselves act against the external force acting in the direction in which the protrusion of the fixing member is pulled out. Therefore, the elastic pieces or the elastic beams move away from each other outwardly, and are removed from the locking hole. As a result, only the fixing member is pulled out, and the clip is left mounted in the to-be-fixed member. Reuse of the to be mounted member requires complicated operations such as the operations of removing and remounting the left clip.

SUMMARY OF THE INVENTION

It is an object of the present invention to provide a clip capable of being mounted integrally with a fixing member with reliability when the fixing member is inserted and fixed in a mounting hole of a to-be-fixed member, and capable of being removed from the to-be-fixed member with no damage and with ease for being subjected to reuse together with the fixing member when the fixing member is pulled out of the to-be-fixed member.

In order to attain the foregoing object, a clip in accordance with an aspect of the present invention includes: a base having a U shape composed of a pair of mutually opposing parallel sections, and a joining section having flexibility and disposed integrally with the lower parts of the parallel sections, an elastic piece respectively branching from the insides of the parallel sections toward the symmetry axis of the base, and further extending along the base, claws respectively protruding toward the symmetry axis of the base on the elastic piece, and step sections having upper surfaces respectively projecting outward from the outer sides of the parallel sections and being inclined obliquely downward. The clip is configured to fix a fixing member to a to-be-fixed member in such a manner that, a protrusion extending from the fixing member and including a locking hole provided therein passes from the open end of the parallel sections through between the elastic piece and extends into the innermost part thereof along the symmetry axis of the base, and the claws are capable of being locked in the locking hole of the protrusion, the base mounting the protrusion therein is press inserted in a mounting hole provided in the to-be-fixed member, and then, the step sections pass through the mounting hole, and thereafter, the step sections are respectively expanded to the left and right sides by the elastic return of the base, such that the upper surfaces are locked at the back rim portion of the mounting hole, characterized in that in order to prevent that the base approaches the elastic piece by the bending toward the symmetry axis direction of the base due to the passage of the step sections through the mounting hole, and that the claws are unlocked from the locking hole when a pull load has acted on the fixing member, abutting portions are formed such that the base abuts the elastic piece at the positions in the vicinity of and outside of the locking hole.

Further, the clip in accordance with another aspect of the invention is characterized in that the elastic piece are disposed between the protrusion and the base such that the elastic piece are pressed against the protrusion by the region between each portion branching from the base and positioned on the opening side of the U shape and the each abutting portion when a pull load has acted on the fixing member.

Still further, the clip in accordance with a still other aspect of the invention is characterized in that the claws and the abutting portions are disposed at the respective tip portions of the elastic piece situated in the inner part of the U shape opposite to the opening.

Furthermore, the clip in accordance with a furthermore aspect of the invention is characterized in that the protrusion is interposed along the symmetry axis of the base at two sites of a region between two tongue pieces mutually extending inwardly in opposed directions from the open end of the parallel sections, and a depression provided at the lower end portion of the base.

In addition, the clip in accordance with an additional aspect of the invention is characterized in that the elastic piece each has a reduced thickness portion formed by picking a part of the outer side along the symmetry axis.

Further, the clip in accordance with a further aspect of the invention is characterized in that the elastic piece are configured such that projections for restricting the clearance from the base are disposed on their respective outer sides opposite to the claws, and that the free ends of the elastic piece extend beyond the claws to interpose the protrusion of the fixing member therebetween.

Still further, the clip in accordance with a still further aspect of the invention is characterized in that the reduced thickness portions are substantially formed along the symmetry axis corresponding to the upper regions of the step sections, and further, at the parallel sections of the base, elastic projections each for restricting the clearance toward the reduced thickness portion are formed.

In addition, the clip in accordance with an additional aspect of the invention is characterized in that the claws respectively disposed on the left and right elastic piece are each formed, at the bottom side, in an inclined surface increasing in height from the inner side toward the outer side.

Finally, the clip in accordance with a furthermore aspect of the invention is characterized in that he abutting portions are respectively situated outside the positions at which the locking hole and the claws are locked.

With the configuration of the clip of the invention, in the process in which the step sections formed at the parallel sections enter the mounting hole, the asymmetric U-shaped base composed of the parallel sections and the joining section connected thereto bends in mutually approaching directions toward the symmetry axis. When the step sections have passed through the mounting hole, the base returns to the original shape by elastic return. In particular, when the fixing member is pulled out the mounting hole of the to-be-fixed member, the claws disposed on the tip portions of the elastic piece are lifted upwardly by the locking hole provided in the protrusion of the fixing member, so that the upper inclined surfaces of the step sections of the base are slightly fitted in the mounting hole. Thereafter, when a pull load further acts on the protrusion, in the process until the outermost surface of each step section is fitted in the mounting hole, the base is regulated by the abutting portions and geometrically it is not removed therefrom.

Further, with the foregoing configuration, for the engagement between the claw and the locking hole, each elastic piece includes the abutting portion abuttable with the joining section of the base and disposed on the opposite side of the elastic piece to the claw. Therefore, the pressing force against the elastic pieces generated by the bending of the joining section takes the form of directly pushing out the claws into the locking hole toward the symmetry axis. Accordingly, each claw engages at a deeper position in the locking hole with reliability. This prevents the claws from moving outwardly from the locking hole even when a large pull load acts on the protrusion of the fixing member. Therefore, the fixing member is not broken even under such a large pull load, and exhibits a large lock holding power. Accordingly, the integration of the fixing member and the base is sufficiently ensured.

Simultaneously therewith, the bending of the joining section toward the symmetry axis causes the claw inwardly formed on each elastic piece to be positioned so as to be in alignment with the locking hole provided in the protrusion. The pull load further acts on the protrusion, so that the lower part of the inner circumferential surface of the locking hole comes in contact with the bottom of each claw. As a result, an attempt is made to try to raise the base. However, at this step, the upper surface of each step section of the base has an inclination, and hence a slight load acts on each claw through each elastic piece for the step section to enter into the mounting hole. The claw receives an upward stress at the tip portion, and hence it is escaping from the locking hole to the outside. Incidentally, when the stage has been reached where the outermost side of each step section starts to enter the inside of the mounting hole, the pressing force from the joining section furthermore increases. This inhibits the claws from moving outwardly, and finally moves it in such a direction as to be pushed into the locking hole. As a result of this, the contact area between the lower part of the inner circumferential surface of the locking hole and the bottom of each claw is prevented from being reduced, or enlarged. Accordingly, the pull load is effectively transferred to each elastic piece. Simultaneously, the outward movement of each elastic piece itself is also restricted by the increased pressing force of the joining section. This still further ensures the integration of the clip and the fixing member.

With the configuration of the clip of the invention, the joining section connected to the lower parts of the parallel sections bends toward the direction of the symmetry axis. As a result, each elastic piece configured as substantially a cantilever is externally pressed, so that the inner side thereof is pressed against the protrusion inserted in a fitted manner into the base and extending from the fixing member. Then, the bending of the joining section of the base further increases at the stage where the step sections are completely entering the inside of the mounting hole, which results in a further increase in the pressing force on the elastic pieces. Accordingly, the inner side of each elastic piece intensively presses against and comes in contact with the side of the protrusion while expanding the abutting region on the side of the protrusion along the direction of the length. This results in the generation of a large friction holding power against the pull load between the elastic pieces and the protrusion. When the pull load subsequently continues to act, the clip and the protrusion burst out of the mounting hole in an integral state.

As a result, the fixing member exhibits a larger holding power in a combined manner of the friction holding power of each elastic piece itself against the protrusion and the locking force of each claw in the locking hole. Even when a further larger pull load acts on the fixing member, the clip and the fixing member are pulled integrally with each other in a generally undamaged state out of the mounting hole of the to-be-fixed member. Then, the pulled clip is removed from the fixing member and subjected to reuse.

With the configuration of the clip of the invention, the region of the inner side of the elastic piece along the symmetry axis abuttable on the side of the protrusion of the fixing member is expanded. Therefore, when the elastic piece is pressed against and brought in contact with the side of the protrusion, a larger friction holding power can be obtained.

With the configuration of the clip of the invention, the protrusion is sandwiched at the upper and lower end portions of the base. This enables the production of the largest holding moment. As a result, it becomes possible for the protrusion to exhibit a large resistance against a transverse external force, and to invariably assume a posture in accordance with the symmetry axis Further, with the configuration of the clip of the invention, when the fixing member is pulled out of the mounting hole, most of the pull load acing on the reduced thickness portion substantially offset toward the protrusion is converted into a large bending force swelling out toward the protrusion intensively. However, the reduced thickness portion is in surface contact with the protrusion. Therefore, the bending force cannot be absorbed by causing the reduced thickness portion to swell sideways, but is converted into the press contact force on the protrusion side while causing slight buckling due to the axial compression. Accordingly, a large friction holding power against the pull load is generated between the inner side in the reduced thickness portion of each elastic piece and the side of the protrusion. As a result, the integration of the clip and the fixing member is maintained Still further, with the configuration of the clip of the invention, even when a small pull load has acted on the fixing member, a slight bending force generated at the joining section is directly transferred to the free end and the claw of each elastic piece as a pressing force through the projection. As a result, the inner side of each free end is pressed against the lower part of the circumferential surface of the locking hole. Simultaneously therewith, each claw is inserted along its entire length deeply in the inside of the locking hole. Therefore, even when a small pull load has acted on the bottom surface of each claw through the bottom of the inner circumferential surface of the locking hole, the claw receives the load along its entire length, and is inhibited from moving outwardly or warping upwardly.

As a result of this, even when the diameter of the mounting hole in the to-be-fixed member is a little large, in other words, even when the amount of bending of the joining section toward the symmetry axis is slight, a sufficient integration of the clip and the fixing member can be obtained, which imparts flexibility to the diameter size of the mounting hole. This imparts the general versatility to the clip itself. Whereas, conversely, when the diameter of the mounting hole is constant, the same holding power for the fixing member can be obtained even if the step section of the base is reduced in height. Accordingly, the frictional resistance upon press inserting in and pulling out of the mounting hole is reduced. This results in the clip capable of being mounted to and removed from the to-be-fixed member by a slight force.

Still further, with the configuration of the clip of the invention, in the process of pulling out the fixing member, the reduced thickness portion of the elastic piece is applied with an excessive pull load. This resultantly causes bending deformation in the reduced thickness portion of each elastic piece toward the parallel section of the base. The bending deformation is regulated by disposing the elastic projection for restricting the clearance toward the axial central position of the reduced thickness portion. Such projections have elasticity. This is intended for absorbing the deviations of the clearance at the left and right parallel sections when the step sections pass therethrough in the case where the precision of the mounting hole of the to-be-fixed member is low and shows variations. This can also respond to the variations in the height of the step section, the thickness of the elastic piece, and the thickness of the protrusion, which imparts the general versatility to the clip itself.

Further, each reduced thickness portion is substantially formed correspondingly to the upper region of each step section for the following reason. Each elastic piece receives the largest compressive load in the case where the inclined upper surface of the step section engages the rim portion of the mounting hole. The formation of the reduced thickness portion in the axial region corresponding to the step section in that case also forces the elastic projection to be disposed in the axial region covering the step section. The functions of the elastic projection are not only to inhibit the bending deformation but also to absorb a wide range of deviations in the height of the step section, the thickness of the elastic piece, the thickness of the protrusion, and the like, as described above. In consideration of this point, a certain degree of clearance is required between the elastic piece and the parallel section. The axial position of the reduced thickness portion serving such objects is generally restricted to the region at a higher level than that of the step section.

Of course, it is impossible in actuality that the elastic projection is disposed correspondingly to the back of the step section in consideration of the amount of bending of the parallel sections entailed by the bending of the base. In any case, the clip in accordance with the invention has such a configuration, wherein the reduced thickness portion is disposed in the elastic piece against the pull load acting on the protrusion of the fixing member, and the elastic projection for inhibiting the bending deformation toward the base is disposed at each parallel section. This ensures a sufficient frictional holding power, which implements the satisfactory integration with the clip when the pull load has acted on the fixing member. Therefore, such a situation in which only the clip is left behind in the mounting hole is avoided.

Furthermore, with the configuration of the clip of the invention, when a pull force acts on the fixing member, the inner end of each claw is engaged in the inner circumferential surface of the locking hole. As a result, a pair of the claws are locked in the inner circumferential surface of the locking hole with reliability without moving in the oppositional directions. Therefore, even when a large pull force has acted on the fixing member, such a situation in which only the clip is left behind in the mounting hole is avoided.

Finally, with the configuration of the clip of the invention, the base tends to undergo bending deformation with respect to the abutting portions as the supporting points. This prevents the claws from being removed from the locking hole with more reliability, and further facilitates the mounting and removal of the clip in and from the mounting hole. Accordingly, it is possible to prevent the clip from being removed from the fixing member when the clip is mounted in and removed from the mounting hole with more reliability.

Below, some examples of the clip in accordance with the invention will be described by reference to the appended drawings.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Figure 1:
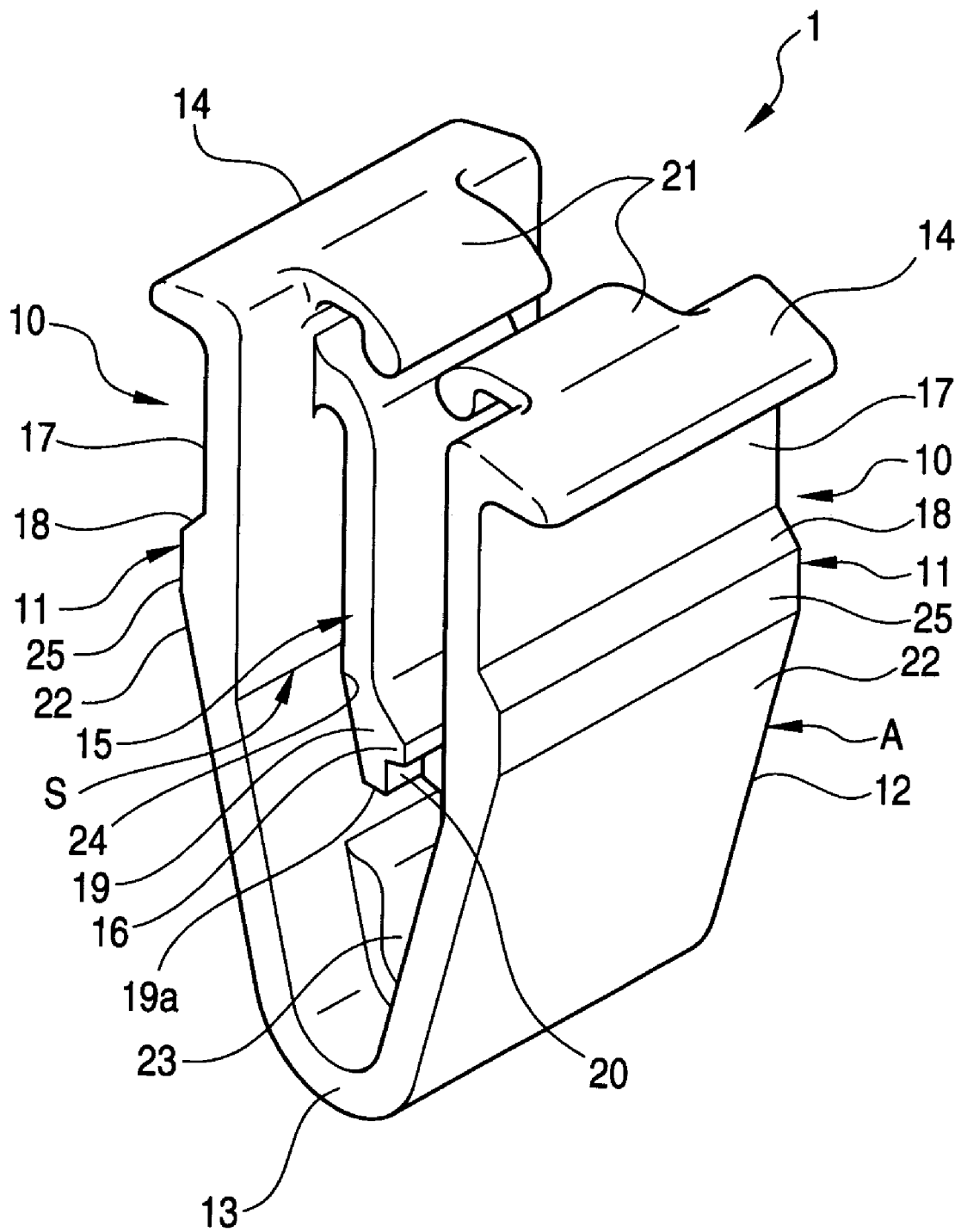
FIG. 1 is a perspective view of a clip in accordance with a first example of the present invention.
Figure 2:
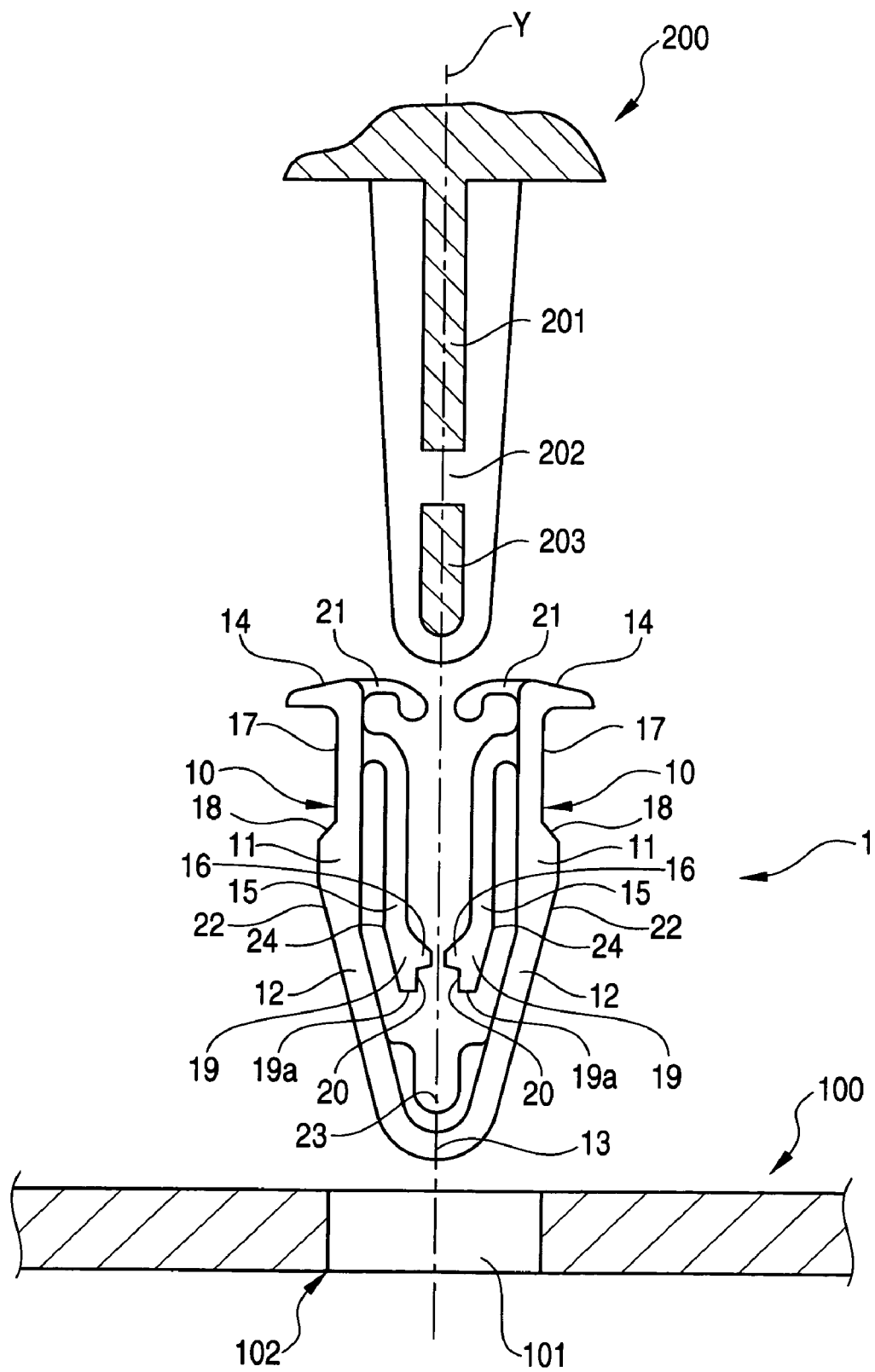
FIG. 2 is an explanatory layout diagram showing the positional relationship among the clip in accordance with the first example, a fixing member, and a to-be-fixed member prior to the fixed state.
Figure 3:
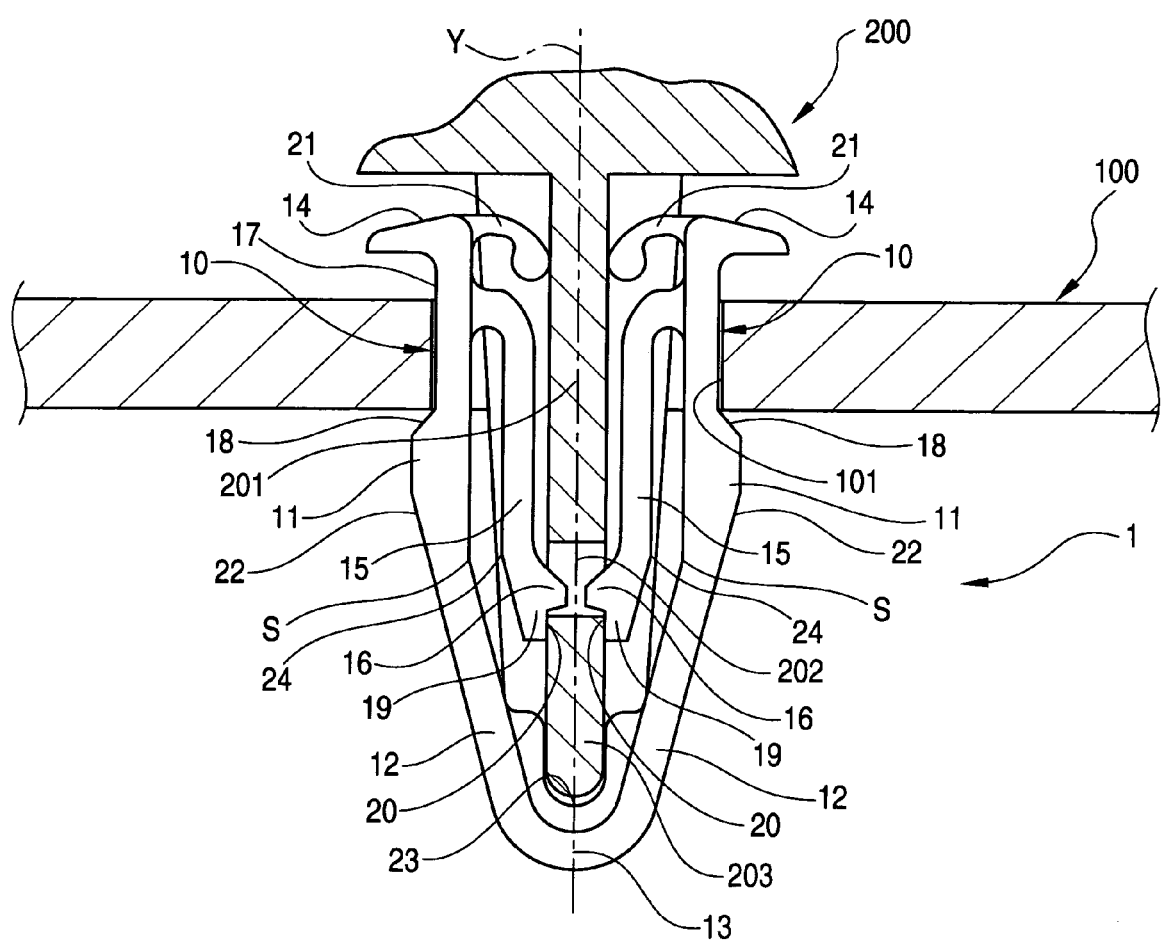
FIG. 3 is a longitudinal sectional view of the clip in accordance with the first example in the fixed state.
Figure 4:
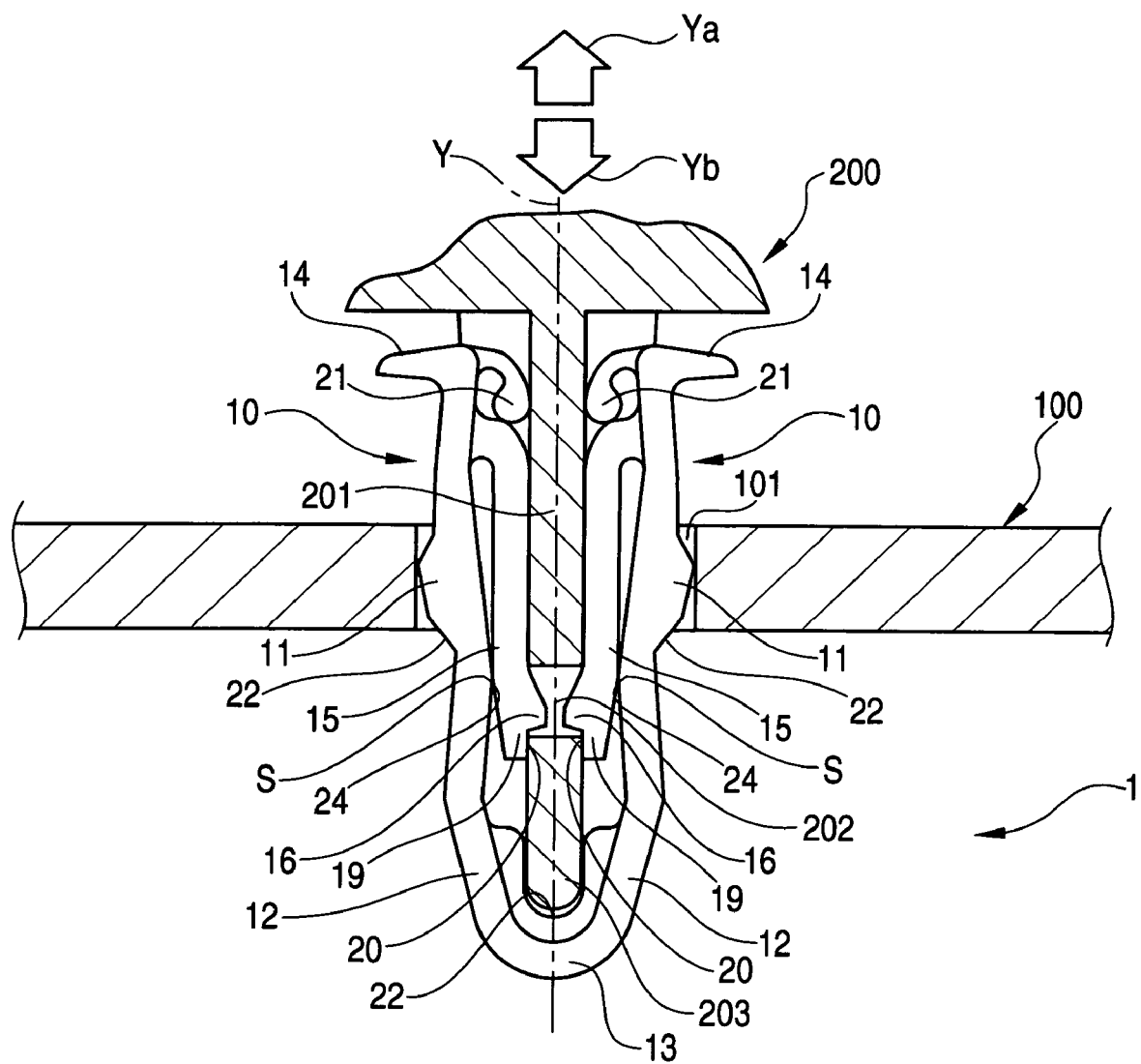
FIG. 4 is a longitudinal sectional view of the clip in accordance with the first example in the process of being press inserted to or pulled out from a mounting hole of the to-be-mounted member.
Figure 5:
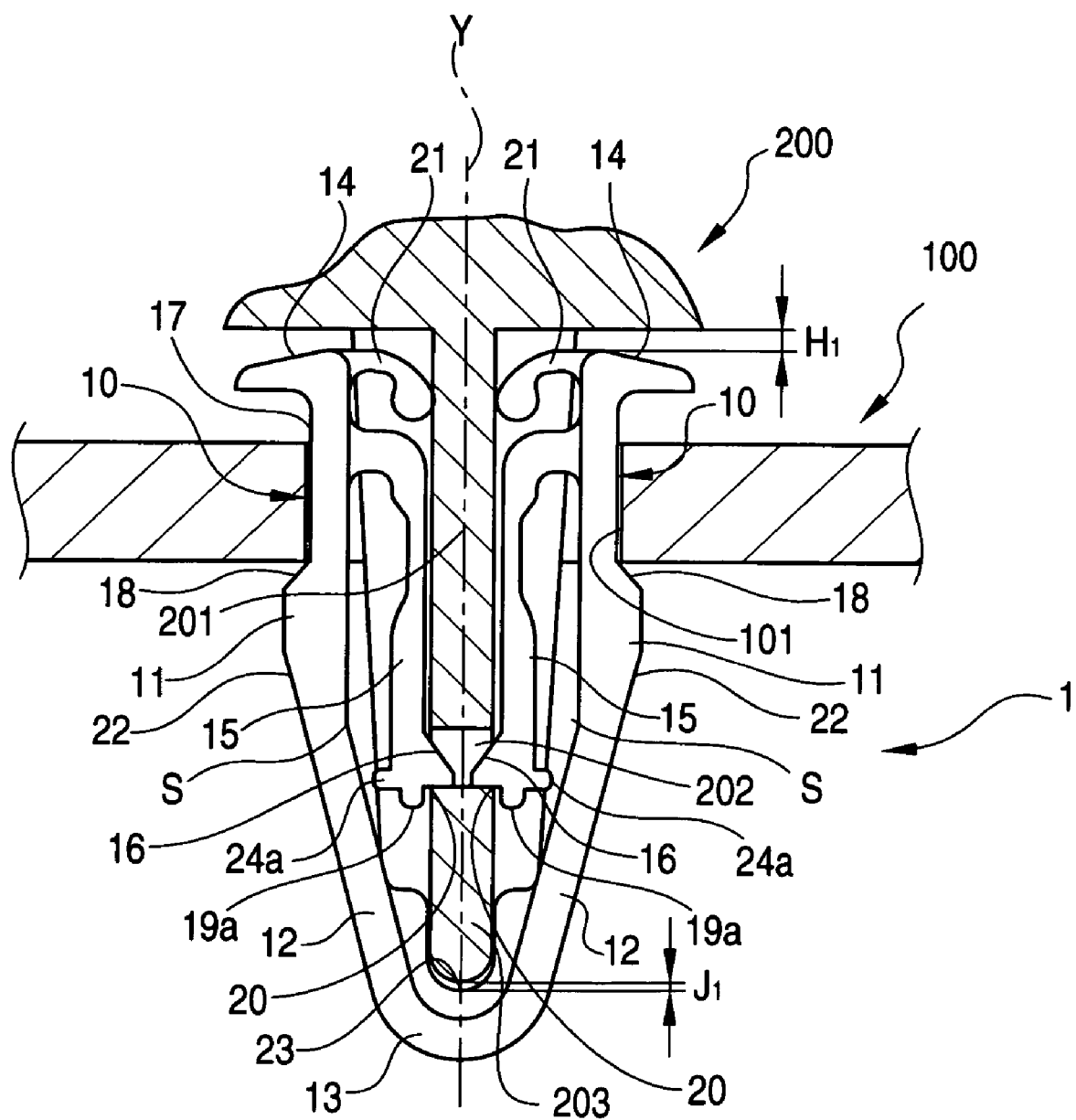
FIG. 5 is a longitudinal sectional view of a clip in accordance with a second example of the invention in the fixed state.
Figure 6:
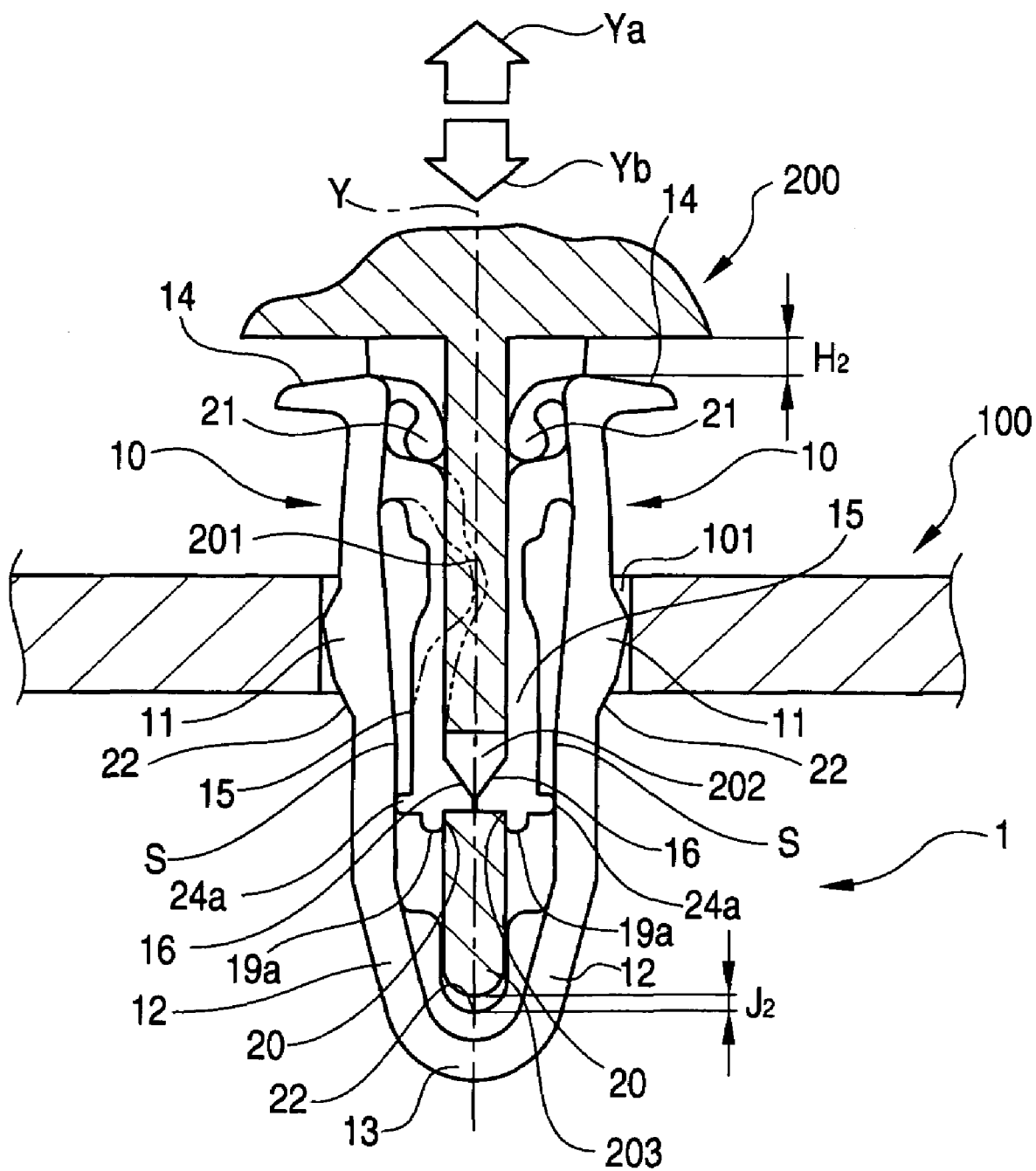
FIG. 6 is a longitudinal sectional view of the clip in accordance with the second example of the invention in the process of being press inserted to or pulled out from the mounting hole of the to-be-mounted member.
Figure 7:
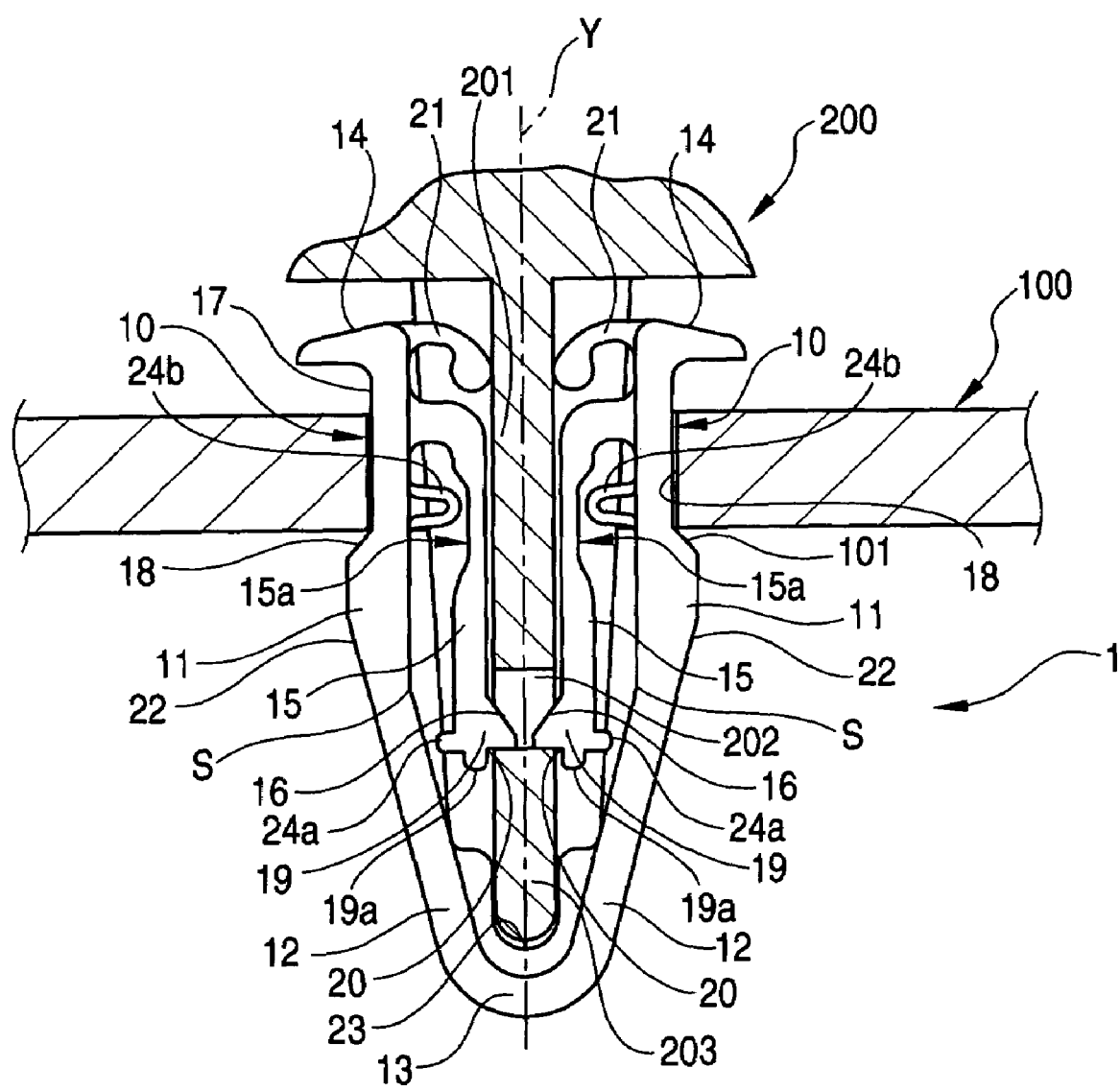
FIG. 7 is a longitudinal sectional view of a clip in accordance with a third example of the invention in the fixed state.
Figure 8:
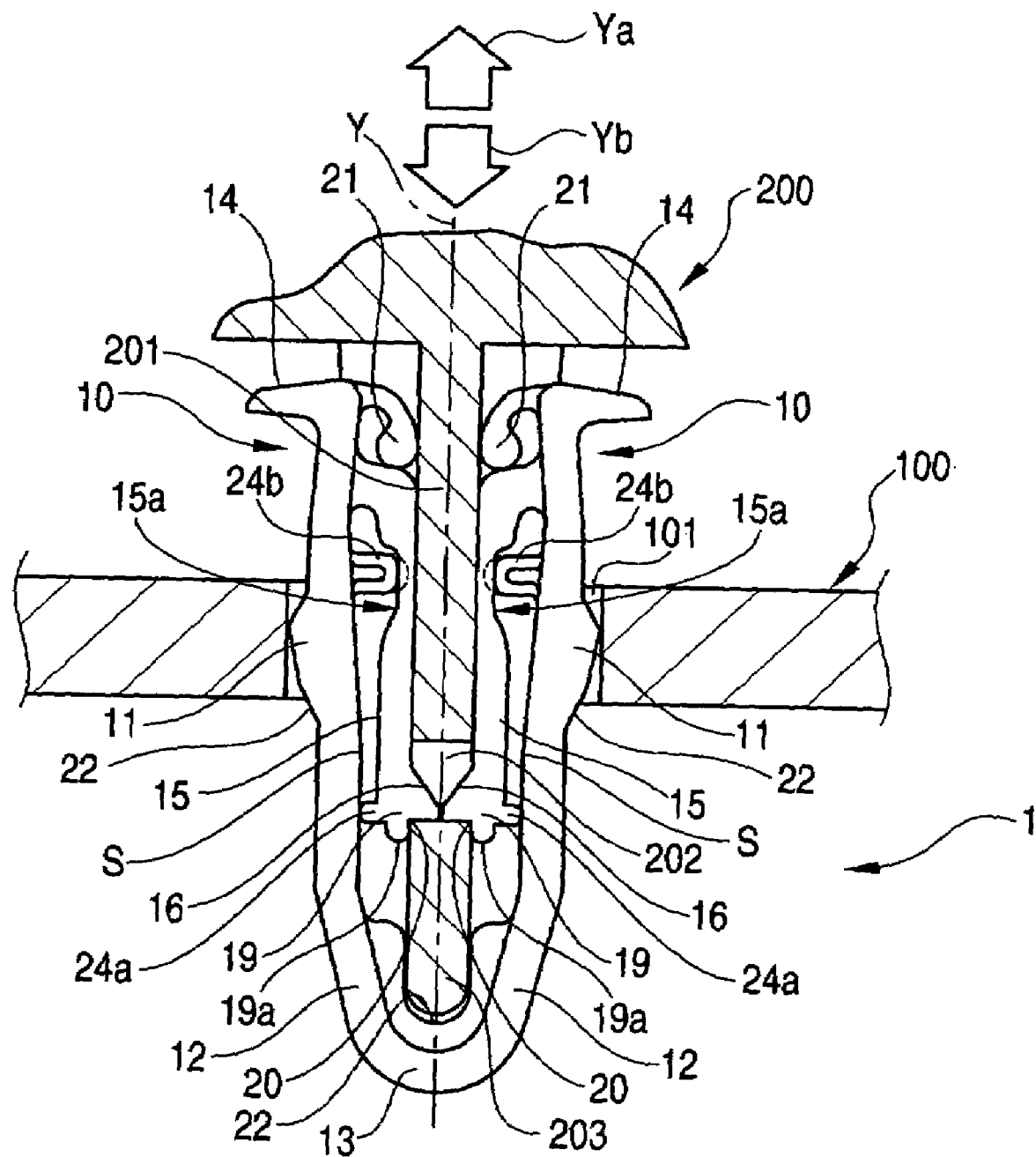
FIG. 8 is a longitudinal sectional view of the clip in accordance with the third example in the process of being press inserted to or pulled out from the mounting hole of the to-be-mounted member.
Figure 9:
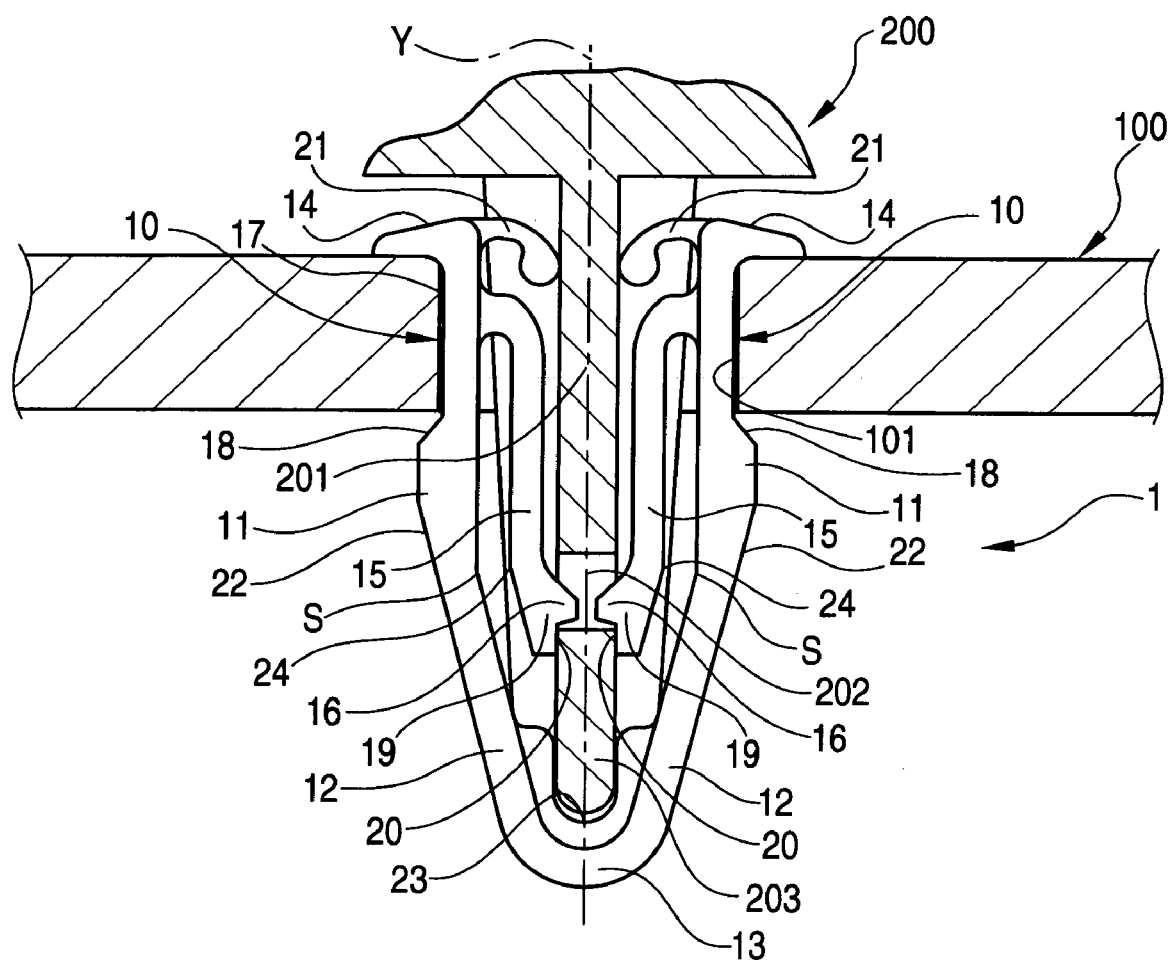
FIG. 9 is a longitudinal sectional view of the clip which is the same as with FIG. 3, but is different in the thickness of the to-be-fixed member in the fixed state.
Figure 10:
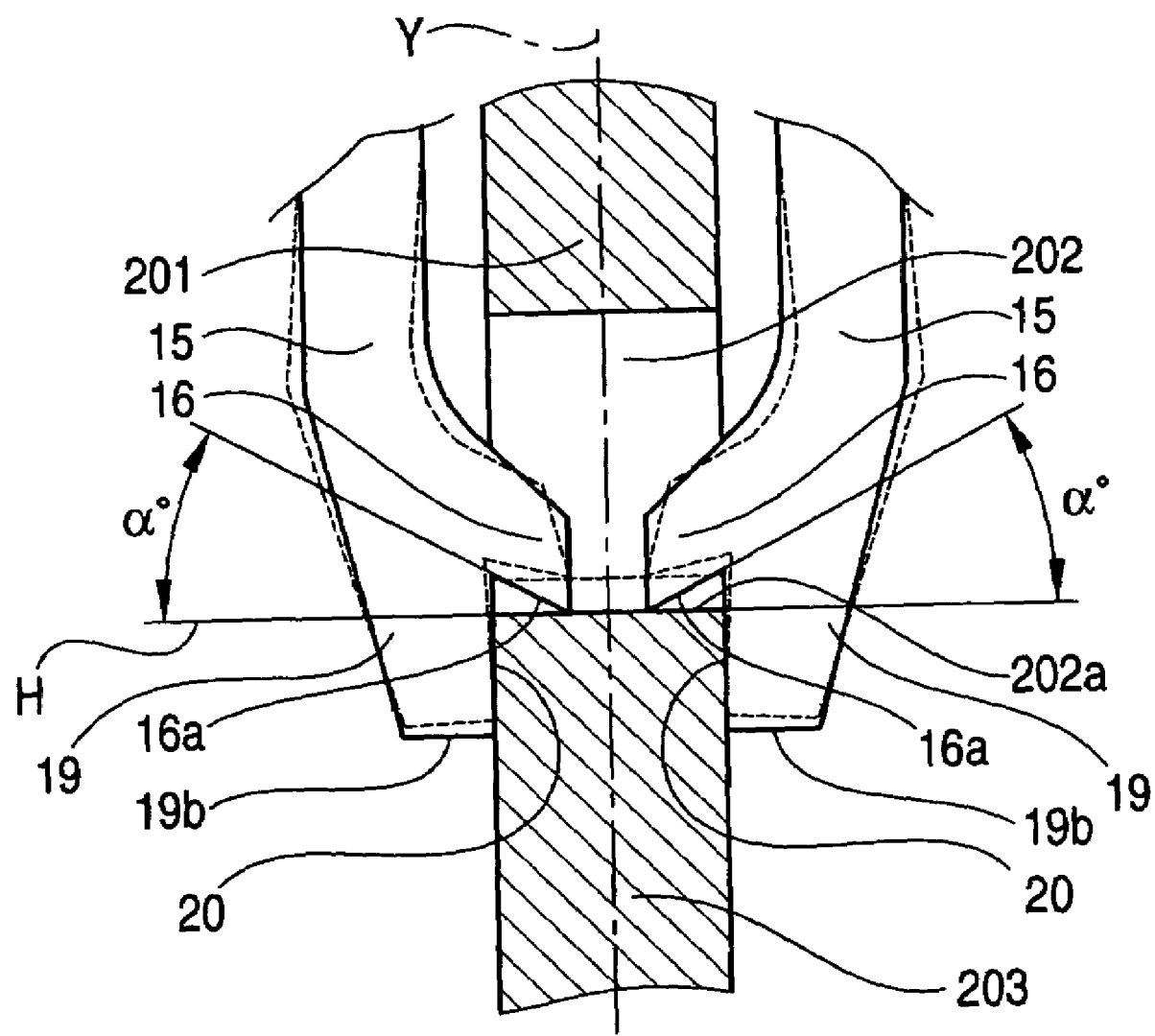
FIG. 10 is a partial enlarged longitudinal sectional view showing a modified example regarding a claw of the clip in accordance with the first example of the invention.

FIG. 1 is a perspective view of a clip in accordance with a first example of the present invention. FIG. 2 is an explanatory layout diagram showing the positional relationship among the clip shown in FIG. 1, a fixing member, and a to-be-fixed member prior to the fixed state. FIG. 3 is a longitudinal sectional view of the clip shown in FIGS. 1 and 2 in the fixed state. FIG. 4 is a longitudinal sectional view of the clip shown in FIG. 3 in the process of being press inserted to or pulled out from a mounting hole of the to-be-fixed member. FIG. 5 is a longitudinal sectional view of a clip in accordance with a second example of the invention in the fixed state. FIG. 6 is a longitudinal sectional view of the clip shown in FIG. 5 in the process of being press inserted to or pulled out from the mounting hole of the to-be-fixed member. FIG. 7 is a longitudinal sectional view of a clip in accordance with a third example of the invention in the fixed state. FIG. 8 is a longitudinal sectional view of the clip shown in FIG. 7 in the process of being press inserted to or pulled out from the mounting hole of the to-be-fixed member. FIG. 9 is a longitudinal sectional view of the clip which is the same as with FIG. 3, but is different in the thickness of the to-be-fixed member in the fixed state. FIG. 10 is a partial enlarged longitudinal sectional view showing a modified example regarding a claw of the clip in accordance with the first example shown in FIGS. 1 to 4 and FIG. 9.

In FIGS. 1 to 4, a clip 1 in accordance with the first example of the invention has a base A shaped like a letter "U" as a whole, composed of a pair of mutually opposing parallel sections 10, and a generally V-shaped flexible joining section 12 for interconnecting the lower parts of these parallel sections 10. Incidentally, the base A is configured such that the parallel sections 10 are disposed at the axisymmetric positions with respect to a symmetry axis Y crossing the central bottom of the joining section 12. At the respective upper edges of the parallel sections 10, flange sections 14 respectively extending outwardly and flexible tongue pieces 21 respectively extending inwardly in opposed directions are integrally formed.

Further, in the inside of the base A, a pair of elastic pieces 15 branching from the insides of the parallel sections 10 in the opposed directions, and bending generally at a right angle and extending along the parallel sections 10 and the joining section 12 are disposed bilaterally symmetrically about the symmetry axis Y as the center. Further, claws 16 respectively protrude toward the symmetry axis Y at the tip portions of the elastic pieces 15. The clip 1 includes step sections 11 each having an upper surface 18 projecting from the outer side of each parallel section 10, and being inclined obliquely downward. Each of the step sections 11 has a cross sectional shape of a trapezoid itself, wherein the upper surface 18 and a lower surface 22 being inclined in the opposite direction thereto are coupled via a flat surface 25. Incidentally, the inclination angle of the lower surface 22 is more gentle than that of the upper surface 18, and generally coincides with the outer inclined surface of the joining section 12.

Further, the base A has portions each bending inwardly in the shape of a letter "L" with respect to a boundary line S of the connecting portion between the lower part of each parallel section 10 and each inclined top portion of the joining section 12 generally in the shape of a letter "V" as the center. Each elastic piece 15 has an abutting portion 24 which is a bent exterior angle portion corresponding thereto. The portion extending in an inclined manner in parallel with the joining section 12 downward inwardly of the lower part of the abutting portion 24 forms a tip portion 19. Thus, each claw 16 is provided on the opposite side of the tip portion 19 to the abutting portion 24. Incidentally, the tip portion 19 extends beyond the claw 16, and further extends until a free end 19a.

As apparent from FIG. 2, on the other hand, in order to fix a fixing member 200 in a rectangular mounting hole 101 of a to-be-fixed member 100 with the clip 1, a plate-like protrusion 201 including a locking hole 202 in its tip portion 203 integrally extends from the fixing member 200 downwardly in the vertical direction. The to-be-fixed member 100 is preferably, for example, a body-side interior panel or a dashboard panel of an automobile, and the fixing member 200 is conceivably an instrument panel or a switchboard. Incidentally, the application examples are not limited to the automobile-related products, but include mounting of home-related equipment, household electrical appliances, and the like, such as wall panels and household electrical appliances. Thus, the clip 1 finds a considerably wide range of use.

As apparent from reference to FIGS. 2 and 3, for mounting of the fixing member 200 having the protrusion 201 in the rectangular mounting hole 101 made in the to-be-fixed member 100, the protrusion 201 is inserted in a fitted manner along the symmetry axis Y from the open end of the parallel sections 10 constituting the upper portions of the base A. It passes through between the flexible tongue pieces 21 extending from the opposite sides of the open end, and is caused to advance between a pair of the elastic pieces 15. Further, the claws 16 extending from the respective tip portions 19 of the elastic pieces 15 in the opposed directions are fitted into the locking hole 202 provided in the tip portion 203 of the protrusion 201 from the opposite sides, and further it is pressed therein until it reaches a depression 23 provided at the lower end portion 13 of the base A.

Therefore, the protrusion 201 is sandwiched along the symmetry axis Y of the base A with the top portion between the two tongue pieces 21 and the lower tip portion 203 in the depression 23 of the lower end portion 13 of the base A. This enables the protrusion 201 to produce the largest holding moment with the base A being inserted in a fitted manner in the mounting hole 101 provided in the to-be-fixed member 100 as shown in FIG. 4. As a result, it becomes possible for the protrusion 201 to exhibit a large resistance against a transverse external force, and to invariably assume a posture in accordance with the symmetry axis Y.

Then, by reference to FIGS. 2 to 4, a description will be given to the operation of from press inserting until fixing of the clip 1, in which the protrusion 201 of the fixing member 200 has previously been inserted in the foregoing procedure, into the mounting hole 101 provided in the to-be-fixed member 100. The protrusion 201 of the fixing member 200 is press inserted downwardly indicated by an arrow Yb integrally with the base A into the mounting hole 101 of the to-be-fixed member 100. The flat surface 25 of each step section 11 passes through the mounting hole 101, while the lower surface 22 with a gentle inclination of each step section 11 is being rubbed by the rim portion of the mounting hole 101. Then, the upper surface 18 having an inclination of each step section 11 formed in the base A matches the back rim portion 102 of the mounting hole 101. Thus, the fixing member 200 is fixed to the to-be-fixed member 100 in an integral manner with the clip 1.

As shown in FIG. 9, with another inserting and fitting method, it is also possible to adopt the following process. The clip 1 is fitted in the mounting hole 101 of the to-be-fixed member 100 in advance. Then, the protrusion 201 of the fixing member 200 is press inserted and fixed similarly in the direction indicated by the arrow Yb between a pair of the elastic pieces 15. In such a case, the axial clearance between each flange section 14 and each step section 11 of the clip 1 is designed as the dimension in accordance with the thickness of the rim portion of the mounting hole 101 in the to-be-fitted member 100.

Incidentally, as apparent from FIG. 4, when the fixing member 200 is pulled out of the to-be-fixed member 100 in the direction indicated by the arrow Ya, the step sections 11 having the inclined upper surfaces 18 pass through the mounting hole 101 upwardly. Accordingly, the parallel sections 10 of the base A mutually move toward the symmetry axis Y. At the same time, the joining section 12 having flexibility and connected to the lower ends of the parallel sections 10 also bends toward the symmetry axis Y. In such a case, a buckling area is formed which is expandable and foldable in the opposite directions with respect to the boundary line S of the connecting portion between the lower part of each step section 11 having rigidity and each parallel section 10 and the top portion of the joining section 12 having flexibility as the center.

Then, a description will be given to the process of pulling the fixing member 200 out of the mounting hole 101 of the to-be-fixed member 100 together with the clip 1.

The protrusion 201 with the pull load Ya not acting on the fixing member 200 is being freely fitted between the opposing elastic pieces 15 as shown in FIG. 3. The claws 16 are also similarly being freely fitted in the locking hole 202. However, when the pull load Ya acts on the fixing member 200, the lower part of the inner circumferential surface of the locking hole 202 provided in the tip portion 203 of the protrusion 201 comes into contact with the bottom of each claw 16 extending from the tip portion 19 of each elastic piece 15, and lifts the base A upwardly. As a result, the upper surface 18 having an inclination of each step section 11 starts to enter the inside of the mounting hole 101, so that the U-shaped joining section 12 of the base A starts to bend toward the symmetry axis Y. However, at this time point, the clip 1 and the fixing member 200 still remain in the mounting hole 101.

Thereafter, when the pull load Ya further acts on the protrusion 201, the inclined upper surface 18 of each step section 11 fits further deeply into the lower rim portion of the mounting hole 101, sot that the joining section 12 connected to the lower parts of the parallel sections 10 of the base A bends toward the symmetry axis Y of the base A. As a result, the buckling area S of the joining section 12 externally presses the abutting portion 24 of each elastic piece 15 configured as substantially a cantilever. Accordingly, it presses the inner side of each elastic piece 15 against the side of the protrusion 201 extending from the fixing member 200 inserted in the fitted manner in the base A.

As shown in FIG. 4, when the pull load Ya further continues to act on the fixing member 200, the bending of the joining section 12 of the base A further increases at the stage where the flat surfaces 25 of the step sections 11 are completely entering the inside of the mounting hole 101, which results in a further increase in the pressing force on the elastic pieces 15. Accordingly, the inner side of each elastic piece 15 intensively presses against and comes in contact with the side of the protrusion 201 while expanding the abutting region on the side of the protrusion 201 of the fixing member 200 along the direction of the length by the elasticity. This results in the generation of a large friction holding power against the pull load between the elastic pieces 15 and the protrusion 201. When the pull load Ya subsequently continues to act, the clip 1 and the protrusion 201 burst out of the mounting hole 101 in an integral state.

Simultaneously therewith, the pressing force generated by the bending of the joining section 12 toward the symmetry axis Y causes the claw 16 inwardly formed on each elastic piece 15 to be positioned so as to be in alignment with the locking hole 202 provided in the protrusion 201. The pull load Ya further continues to act on the protrusion 201, so that the lower part of the inner circumferential surface of the locking hole 202 comes in contact with the bottom of each claw 16. As a result, an attempt is made to try to raise the base A. However, at this step, the upper surface 18 of each step section 11 of the base A has an inclination, and hence a slight load acts on each claw 16 through each elastic piece 15 for the step section 11 to enter into the mounting hole 101. The claw 16 which has not yet completely been pushed into the locking hole 202 receives an upward load stress at the tip portion, and hence it is escaping from the locking hole 202 to the outside.

However, when the stage has been reached where the flat surface 25 which is the outermost side of each step section 11 starts to enter the inside of the mounting hole 101, the pressing force generated by the still larger bending from the joining section 12 furthermore increases. This inhibits the claws 16 from moving outwardly, and finally moves it in such a direction as to be pushed into the locking hole 202. As a result of this, the contact area between the lower part of the inner circumferential surface of the locking hole 202 and the bottom of each claw 16 is enlarged. Accordingly, the pull load Ya is effectively transferred to each elastic piece 15. Simultaneously, the outward movement of each elastic piece 15 itself is also restricted by the pressing force increased to the maximum of the joining section 12. This still further ensures the integration of the clip 1 and the fixing member 200.

As a result, the fixing member 200 exhibits a larger holding power in a combined manner of the friction holding power of each elastic piece 15 itself against the protrusion 201 and the locking force of each claw 16 in the locking hole 202. Even when a further larger pull load Ya acts on the fixing member 200, the clip 1 and the fixing member 200 are pulled integrally with each other in a generally undamaged state out of the mounting hole 101 of the to-be-fixed member 100. Then, the pulled clip 1 is then removed from the fixing member 200 and subjected to reuse.

Incidentally, each claw 16 is disposed at the tip portion 19 of each elastic piece 15. This results in the expansion of the region of the inner side of the elastic piece 15 along the symmetry axis Y abuttable on the side of the protrusion 201 of the fixing member 200. Therefore, when the elastic piece 15 is pressed against and brought in contact with the side of the protrusion 201, a larger friction holding power can be obtained.

As described above, for the engagement between the claw 16 and the locking hole 202, each elastic piece 15 includes the abutting portion 24 abuttable with the joining section 12 of the base A and disposed on the opposite side of the elastic piece 15. Therefore, the pressing force against the elastic pieces 15 generated by the bending of the joining section 12 takes the form of directly pushing out the claws 16 into the locking hole 202 toward the symmetry axis Y. Accordingly, each claw 16 engages at a deeper position in the locking hole 202 with reliability. This prevents the claws 16 from moving outwardly from the locking hole 202 even when a large pull load acts on the protrusion 201 of the fixing member 200. Therefore, the fixing member 200 is not broken even under such a large pull load, and exhibits a large lock holding power. Accordingly, the integration of the fixing member 200 and the base A is sufficiently ensured.

Then, by reference to FIGS. 5 and 6, a second example of the clip in accordance with the invention will be described. Incidentally, the elements shown in the second example, which are common to those in the first example, will be described by using the same reference characters and numerals. Herein, a description will be given only to the constitutions and functions different from those in the first example.

In FIG. 5, each elastic piece 15 has a reduced thickness portion 15a formed by picking a part of the outer side along the symmetry axis Y. Further, by reference to FIG. 6, each elastic piece 15 has such a configuration. As a result, when the fixing member 200 is pulled out of the mounting hole 101, most of the pull load acing on the reduced thickness portion 15a substantially offset toward the protrusion 201 is converted into a large bending force (indicated by a two dot dashed line in FIG. 6) swelling out toward the protrusion 201 intensively. However, the reduced thickness portion 15a is in surface contact with the protrusion 201. Therefore, the bending force cannot be absorbed by causing the reduced thickness portion 15a to swell sideways, but is converted into the press contact force on the protrusion side while causing slight buckling due to the axial compression.

Accordingly, a large friction holding power against the pull load Ya is generated between the inner side in the reduced thickness portion 15a of each elastic piece 15 and the side of the protrusion 201. As a result, the integration of the clip 1 and the fixing member 200 is maintained.

Incidentally, the reference signs $J_1$ and $J_2$ ($J_1 < J_2$) shown in FIGS. 5 and 6 each represent the amount of movement of the protrusion 201 corresponding to the pull load which has acted on the fixing member 200. The reference signs $H_1$ and $H_2$ ($H_1 < H_2$) each represent the amount of buckling caused at the reduced thickness portion 15a due to the axial compression of each elastic piece 15 caused by the pull load. Incidentally, such conditions are extremely undesirable from the viewpoint of the reuse of the clip 1. Therefore, close attention should be paid to the amount of thickness to be picked out of each reduced thickness portion 15a.

Further, in FIG. 5, each elastic piece 15 is provided with a projection 24a for restricting the clearance from the joining section 12 on its outer side opposite to the claw 16. Thus, the free end 19a of the elastic piece 15 extends beyond the claw 16. Thus, as understood from FIG. 6, with such a configuration, even when a small pull load Ya has acted on the fixing member 200, a slight bending force generated at the joining section 12 is directly transferred to the free end 19a and the claw 16 of each elastic piece 15 as a pressing force through the projection 24a. As a result, the inner side 20 of each free end 19a is pressed against the lower part of the circumferential surface of the locking hole 202 provided in the tip portion 203 of the protrusion 201 of the fixing member 200. Simultaneously therewith, each claw 16 is inserted along its entire length deeply in the inside of the locking hole 202. Therefore, even when a small pull load Ya has acted on the bottom surface of each claw 16 through the bottom of the inner circumferential surface of the locking hole 202, the claw 16 receives the load along its entire length, and is inhibited from moving outwardly or warping upwardly. As a result, the pull load Ya is transferred to the base A with reliability, resulting in the preferred integration of the base A and the fixing member 200.

As a result of this, even when the diameter of the mounting hole 101 in the to-be-fixed member 100 is a little large, in other words, even when the amount of bending of the joining section 12 toward the symmetry axis Y is slight, a sufficient integration of the clip 1 and the fixing member 200 can be obtained, which imparts flexibility to the diameter size of the mounting hole 101. This imparts the general versatility to the clip 1 itself whereas, conversely, when the diameter of the mounting hole 101 is constant, the same holding power for the fixing member 200 can be obtained even if the step section 11 of the base A is reduced in height. Accordingly, the frictional resistance upon press inserting in and pulling out of the mounting hole lo is reduced. This results in the clip 1 capable of being mounted to and demounted from the to-be-fixed member 100 by a slight force.

Further, a third example of the clip in accordance with the invention will be described by reference to FIGS. 7 and 8. Incidentally, the elements shown in the third example, which are common to those in the first example and the second example, will be described by using the same reference characters and numerals. Herein, a description will be given only to the constitutions and functions different from those in the first example and the second example.

In FIG. 7, in this example, each reduced thickness portion 15a is substantially formed along the symmetry axis Y corresponding to the upper region of each step section 11. Further, at each parallel section 10 of the base A, an elastic projection 24b for restricting the clearance toward the reduced thickness portion 15a is formed. In the process of pulling out the fixing member 200, the reduced thickness portion 15a of the elastic piece 15 is applied with an excessive pull load Ya. This resultantly causes bending deformation in the reduced thickness portion 15a of each elastic piece 15 toward the parallel section 10 of the base A. The bending deformation is regulated by disposing the elastic projection 24b for restricting the clearance toward the axial central position of the reduced thickness portion 15a. Such projections 24b have elasticity. This is intended for absorbing the deviations of the clearance at the left and right parallel sections 10 when the step sections 11 pass therethrough in the case where the precision of the mounting hole 101 of the to-be-fixed member 100 is low and shows variations. This can also respond to the variations in the height of the step section 11, the thickness of the elastic piece 15, and the thickness of the protrusion 201, which imparts the general versatility to the clip 1 itself.

Further, each reduced thickness portion 15a is substantially formed correspondingly to the upper region of each step section 11 for the following reason. Each elastic piece 15 receives the largest compressive load in the case where the inclined upper surface 18 of the step section 11 engages the rim portion of the mounting hole 101. The formation of the reduced thickness portion 15a in the axial region corresponding to the step section 11 in that case also forces the elastic projection 24b to be disposed in the axial region covering the step section 11. The functions of the elastic projection 24b are not only to inhibit the bending deformation but also to absorb a wide range of deviations in the height of the step section 11, the thickness of the elastic piece 15, the thickness of the protrusion 201, and the like, as described above. In consideration of this point, a certain degree of clearance is required between the elastic piece 15 and the parallel section 10. The axial position of the reduced thickness portion 15a serving such objects is generally restricted to the region at a higher level than that of the step section 11.

Of course, it is impossible in actuality that the elastic projection 24b is disposed correspondingly to the back of the step section 11 in consideration of the amount of bending of the parallel sections 10 entailed by the bending of the base A. In any case, the clip 1 in accordance with the invention has such a configuration, wherein the reduced thickness portion 15a is disposed in the elastic piece 15 against the pull load Ya acting on the protrusion 201 of the fixing member 200, and the elastic projection 24b for inhibiting the bending deformation toward the base A is disposed at each parallel section 10. This ensures a sufficient frictional holding power, which implements the satisfactory integration with the clip 1 when the pull load Ya has acted on the fixing member 200. Therefore, such a situation in which only the clip 1 is left behind in the mounting hole 101 is avoided.

In FIG. 10, a modified example in accordance with the claw 16 of the clip 1 in accordance with the first example is shown. A pair of the claws 16 disposed in an opposed relation with respect to the symmetry axis Y of the base A as a center each have a bottom side 16a. The bottom side 16a is inclined in such a manner as to increase in height from the inner side toward the outer side by an angle with respect to the horizontal line H. The inner end thereof is engaged in the inner circumferential surface 202a of the locking hole 202 provided in the protrusion 201 of the fixing member 200. Thus, when a pull force acts on the fixing member 200, the inner end of each claw 16 is engaged in the inner circumferential surface 202a of the locking hole 202. As a result, a pair of the claws 16 are locked in the locking hole 202 with reliability without moving in the oppositional directions.

Thus, it has been experimentally proved that about 1.5-fold pull tensile strength can be obtained by forming the bottom side 16a of each claw 16 in an inclined surface. Therefore, even when a considerably large pull force acts on the fixing member 200, it is possible to pull the clip 1 out of the mounting hole 101 together with the fixing member 200 without buckling or breaking it. Accordingly, such a situation in which the clip 1 is left behind alone in the mounting hole 101 is avoided.

Up to this point, the first to third examples of the clip in accordance with the invention were described. However, as the constitutions commonly applicable to these, although the shape of the protrusion 201 was restricted to the member extending vertically downward integrally from the plate-like fixing member 200 in this example, a round bar-like or cylindrical individual member capable of being assembled for use, which is to be fitted in, or screwed in the fixing member 200, and extends vertically downward is also acceptable as another example. Thus, it is needless to say that variations may be appropriately made according to the use conditions. Whereas, for example, a panel made of a metal is used for the to-be-fixed member 100. In this case, the fixing member 200 is pulled out in the following manner. When the step sections 11 of the clip 1 pass through and slide along the rim portion of the mounting hole 101, they can pass through the mounting hole 101 smoothly without being engaged with excess projections such as burrs protruding from the rim portion of the mounting hole 101 because the step sections 11 also have flexibility toward the direction of the symmetry axis Y as with the base A. Therefore, the clip 1 and the fixing member 200 are integrally pulled away from the mounting hole 101 together with reliability. As a result, the situation in which only the clip 1 is left behind alone in the mounting hole 101 is avoided.

What is claimed is:

1. A clip comprising:
    a base having a U shape comprising a pair of mutually opposing parallel sections, and a joining section having flexibility and disposed integrally with lower parts of the parallel sections;
    an elastic piece respectively branching from insides of the parallel sections toward a symmetry axis of the base, and further extending along the base; and
    a claw protruding toward the symmetry axis of the base on the elastic piece, and step sections having upper surfrces respectively projecting outward from outer sides of the parallel sections and being inclined obliquely downward,
    wherein the clip is configured to fix a fixing member to a to-be-fixed member in such a manner that, a protrusion extending from the fixing member and including a locking hole provided therein passes from an open end of the parallel sections between the elastic piece and extends into an innermost part thereof along the symmetry axis of the base, and the claw is capable of being locked in the locking hole of the protrusion, the base mounting the protrusion therein is press inserted in a mounting hole provided in the to-be-fixed member, and then, the step sections pass through the mounting hole, and thereafter, the step sections are respectively expanded to left and right sides by an elastic return of the base, such that the upper surfaces are locked at a back rim portion of the mounting hole,
    wherein in order to prevent the base from approaching the elastic piece by bending toward the symmetry axis direction of the base due to passage of the step sections through the mounting hole, and to prevent the claw from being unlocked from the locking hole when a pull load has acted on the fixing member, abutting portions are formed such that the base abuts the elastic piece at positions in a vicinity of and outside of the locking hole, and
    wherein the elastic piece is disposed between the protrusion and the base such that the elastic piece is pressed against the protrusion by a region between each portion branching from the base and positioned on an opening side of the U shape and the each abutting portion when a pull load has acted on the fixing member.

2. The clip according to claim 1, where in the claw and the abutting portions are disposed at respective tip portions of the elastic piece situated in an inner part of the U shape opposite to the opening.

3. The clip according to claim 1, wherein the protrusion is interposed along the symmetry axis of the base at two sites of a region between two tongue pieces mutually extending inwardly in opposed directions from the open end of the parallel sections, and a depression provided at a lower end portion of the base.

4. The clip according to claim 1, wherein the elastic piece has a reduced thickness portion formed by picking a part of an outer side along the symmetry axis.

5. The clip according claim 4, wherein the elastic piece is configured such that projections for restricting a clearance from the base are disposed on their respective outer sides opposite to the claw, and that free ends of the elastic piece extend beyond the claw to interpose the protrusion of the fixing member there between.

6. The clip according to claim 4, wherein the reduced thickness portion is substantially formed along the symmetry axis corresponding to the upper regions of the step sections, and further, at the parallel sections of the base, elastic projections each for restricting clearance toward the reduced thickness portion are formed.

7. The clip according to claim 1, wherein the claw respectively disposed on the left and right elastic piece is formed, at a bottom side, in an inclined surface increasing in height from an inner side toward an outer side.

8. The clip according to claim 1, wherein the abutting portions are respectively situated outside positions at which the locking hole and the claw are locked.

9. The clip according to claim 1, wherein said step portion comprises:
- an inclined upper portion, having an inclination angle;
- a declined lower portion, having a declination angle; and
- a flat surface disposed between the inclined upper portion and the declined lower portion.

10. The clip according to claim 9, wherein the declination angle of the declined lower portion has a slope that is less than a slope of the inclination angle of the inclined upper portion.

11. The clip according to claim 1, further comprising a depression portion formed in a lower end of said base to receive an end of the protrusion.

* * * * *